Figure 1:
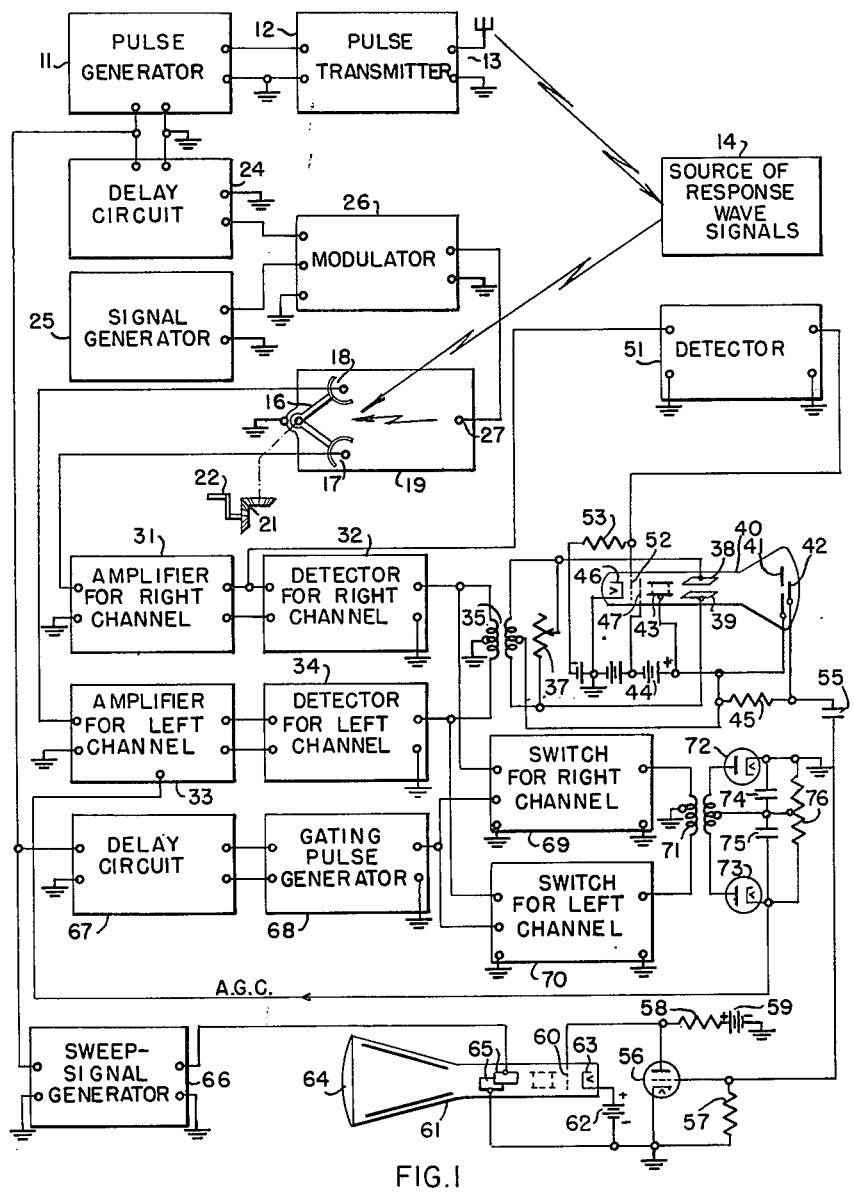

April 28, 1953 K. McILWAIN 2,637,028
RADIATED-SIGNAL DIRECTION FINDER
Filed Jan. 30, 1948 2 SHEETS—SHEET 1

*INVENTOR.*
KNOX McILWAIN
BY John A. Harvey
ATTORNEY

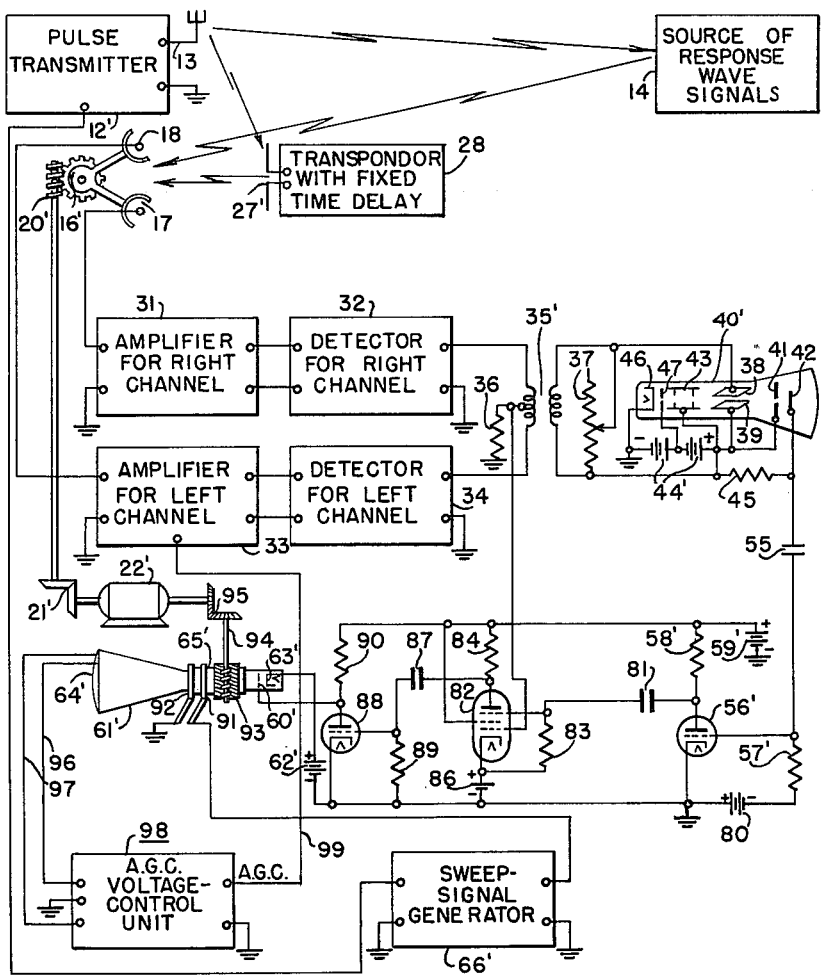
FIG. 3
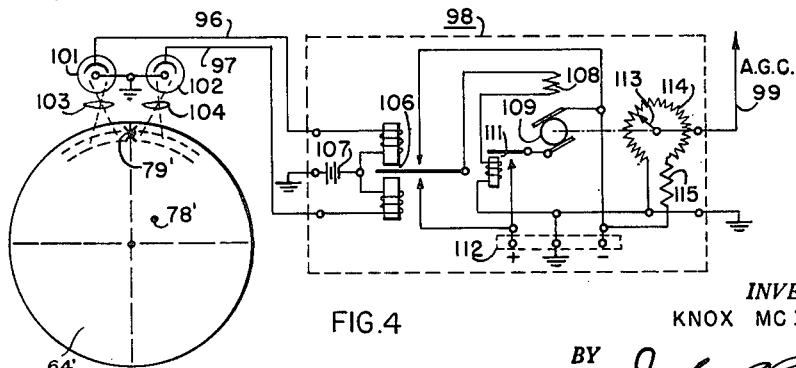
FIG. 4
INVENTOR.
KNOX MCILWAIN
ATTORNEY

Patented Apr. 28, 1953

2,637,028

UNITED STATES PATENT OFFICE 2,637,028

RADIATED-SIGNAL DIRECTION FINDER

Knox McIlwain, New York, N. Y., assignor to Hazeltine Research, Inc., Chicago, Ill., a corporation of Illinois Application January 30, 1948, Serial No. 5,398

13 Claims. (Cl. 343—16)

1

This invention relates to an improved radiated-signal direction finder and, more particularly, to such a direction finder which includes two signal-translating channels arranged to translate signals the amplitudes of which are dependent upon the directivity characteristics of two radiant-signal translators or antennas which usually have partially overlapping directional-response patterns.

A critical element in any direction finder is the radiation-signal translator used to translate wave-signal energy to or from the medium in which the radiated signals propagate. Considering by way of example direction finders utilizing radio wave signals, this translator is a directional antenna which may take the form of a more or less complex array of radiating elements and reflecting elements or, at the higher frequencies, a reflecting surface of parabolic or other cross section or a horn-type antenna. In any case, it is generally the rule that for any particular type the dimensions of such a translator must become larger the greater the directional selectivity desired. In order to provide equivalent directional selectivity with an antenna arrangement of conveniently smaller dimensions, however, it has been proposed to employ two directional antennas having directivity characteristics considerably broader than the highly selective or sharp characteristic desired. The directivity pattern of each such antenna may be considered to be centered on the direction of wave-signal propagation affording maximum response of the antenna. The two antennas are arranged so that their directional-response patterns are centered on divergent directions but partially overlap or intersect each other. Then the effect of a sharp over-all directivity characteristic may be obtained by comparing the amplitudes of a signal intercepted by the two antennas and rejecting the signal unless the antennas are oriented so that the two amplitudes are equal. Such an arrangement is described and claimed in the abandoned application of Harold A. Wheeler, Serial No. 723,680, filed January 23, 1947, and assigned to the same assignee as the present invention.

In such an arrangement, signals intercepted by the two antennas pass through separate signal-translating channels prior to comparison of the signal amplitudes. It has been proposed that the signal amplitudes be compared by applying the signals with opposite polarities to the primary of a transformer having a center-tapped secondary. The two sides of the secondary are connected in balanced diode circuits having a common load impedance, so that a control voltage of a desired polarity is obtained across this load whenever the signal amplitudes are unequal. This control voltage is used to reject the signal from the indicating device. Any unbalance or change in the relative gain conditions of the two channels which may develop after related calibrations thereof causes an erroneous indication of direction. While it is practical in some applications to minimize the occurrence of such a change by suitable mechanical and electrical circuit design, the possibility of an erroneous indication of direction may be highly undesirable or even fatal to the use of such systems in many applications.

Accordingly, it is an object of the present invention to provide a new and improved radiated-signal direction finder which substantially avoids one or more of the limitations and disadvantages of prior direction finders of the type described.

It is also an object of the invention to provide a new and improved radiated-signal direction finder of the type having two signal-translating channels which exhibits greater dependability and accuracy.

It is another object of the invention to provide a new and improved radiated-signal direction finder of the type having two balanced signal-translating channels with a simplified and sensitive arrangement for comparing the amplitudes of output signals in the two channels.

It is a further object of the invention to provide a new and improved radiated-signal direction finder of the type having two signal-translating channels which affords a warning of any undesirable unbalanced condition of the two channels.

In accordance with one feature of the invention, a radiated-signal direction finder comprises means including two signal-translating channels, having individual and relatively adjustable amplitude-translation characteristics, for receiving radiated-signal energy and responsive thereto for producing in the two channels individual output signals having amplitudes individually varying with the direction of arrival of radiated energy at the means. The direction finder also includes means responsive to the relative amplitudes of the individual output signals for indicating the direction of arrival. The accuracy of this indication is dependent upon the maintenance of a predetermined ratio between the values of the amplitude-translation characteristics of the channels, of which at least one may undesirably change to impair the accuracy of indication. The direction finder additionally includes means for periodically applying calibration signals to the channels for translation thereby to produce individual calibration output signals distinguishable from the first-mentioned output signals, and means responsive primarily to the relative amplitudes of the calibration output signals for controlling at least one of the channels substantially to maintain the aforementioned predetermined ratio of the values of the amplitude-translation characteristics, thereby to decrease the effect of changes of value of the aforesaid one characteristic in impairing the accuracy of the indication of direction.

For a better understanding of the present invention, together with other and further objects thereof, reference is had to the following description taken in connection with the accompanying drawings, and its scope will be pointed out in the appended claims.

Figure 2:
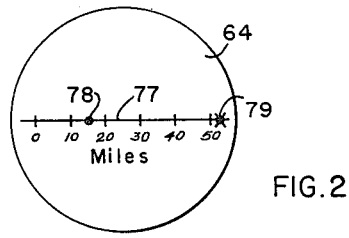

In the drawings, Fig. 1 is a circuit diagram, partly schematic, of a direction finder of the radar type embodying the present invention; Fig. 2 represents a typical indication as provided by an indicating device of the Fig. 1 arrangement; Fig. 3 is a circuit diagram, partly schematic, of a direction finder which affords a plan position indication of remote objects and embodies the present invention in a modified form; and Fig. 4 illustrates a representative indication provided by the Fig. 3 apparatus and also represents a circuit diagram of associated control circuits utilized in the latter.

Referring now more particularly to Fig. 1 of the drawings, there is represented in partly schematic form a radiated-signal direction finder of the radar type utilizing a pulse generator 11 having an output circuit coupled to a pulse transmitter 12. The transmitter has a transmitting antenna 13 which, in conjunction with the generator 11 and transmitter 12, comprises means for radiating pulse-modulated wave-signal energy in the direction of a remote object. This remote object is represented as a source 14 of response wave signals. The object 14 usually is so far removed from the transmitter 12 and from all the other associated apparatus of Fig. 1 that the transmitter and other apparatus may be considered to be located at a single point having a particular directional relationship to the remote object 14. The object or source 14 may be merely a reflector of wave-signal energy, such as a landmark, a ship, or an aircraft. In this case the response-signal frequency is the same as that of the energy radiated by transmitter 12. Alternatively, source 14 may be a fixed or mobile response-signal transmitter of the type known as a transpondor. The latter comprises an arrangement for receiving signals radiated from transmitter 12 and, in response thereto, for developing and transmitting response wave signals of the same or a different carrier frequency and conventionally of pulse-modulation wave form.

The direction finder also includes a rotatable frame 16 carrying two wave-signal receiving antennas 17 and 18. The two antennas 17 and 18 are provided with suitable reflectors facing in somewhat different directions, so that the antennas have individual directional-response characteristics centered on individual relatively divergent directions. Frame 16 is fastened to a unitary rotatable grounded plate 19 extending in the direction faced broadly by the antennas 17 and 18. The antennas and their reflectors are symmetrically arranged above plate 19. Frame 16 and plate 19 may be turned as a unit by a mechanical driving device including bevel gears 21 and a crank 22. Thus the two antennas 17 and 18 have relatively fixed but partially overlapping directional-response patterns movable to scan a predetermined space.

The pulse generator 11 has another output circuit coupled to the input circuit of a delay circuit 24. There also is provided a signal generator 25 tunable to the response-signal frequency. Signal generator 25 and the output circuit of the delay circuit 24 are coupled to a modulator 26. The output circuit of the modulator 26 is coupled to a wave-signal translator or radiator 27 shown as a nondirectional antenna extending vertically above the ground plate 19 at the opposite end thereof from directional antennas 17 and 18. Antenna 27 is supported by the ground plate in insulated relation therewith and so has a predetermined positional relationship to the frame 16 carrying antennas 17 and 18 and is movable therewith. Antenna 27 not only has a fixed directional and distance relationship to the antennas 17 and 18 but also is symmetrical with respect to their directional-response patterns.

There is also provided in the direction finder means including two signal-translating channels for receiving the response wave-signal energy radiated from remote object 14. One of these channels comprises an amplifier 31 having an input circuit coupled to the antenna 17 and an output circuit coupled to a detector 32. The other of these channels comprises a similar amplifier 33 having an input circuit coupled to the antenna 18 and an output circuit likewise coupled to a detector 34. Thus the two channels effectively have individual radiant-signal translator means 17 and 18. The antenna 17 with its amplifier 31 and detector 32 may conveniently be called the "right" channel, while the antenna 18 with its amplifier 33 and detector 34 may be called the "left" channel. The output circuits of the detectors 32 and 34 are coupled to individual halves of a center-tapped primary winding of a transformer 35, the secondary winding of which is shunted by an adjustable resistor 37 and is coupled to a pair of beam-deflecting elements 38, 39 of a cathode-ray tube 40. A centrally apertured mask 41 is provided in tube 40 and positioned with the aperture thereof in opposing relation to a target electrode 42 disposed in the tube 40 for impingement on the electrode 42 of the cathode-ray beam over a predetermined range of deflections thereof. Mask 41 is connected to the conventional second anode 43 of the tube 40. The target electrode 42 is connected to the high-voltage positive terminal of an energizing source 44 through a load resistor 45. The secondary winding of the transformer 35 has a center tap which is connected to the second anode 43 and to the positive terminal of the source 44. The cathode 46 of the tube 40 is connected to a terminal near the negative end of the source 44, and an accelerating anode 47 is suitably connected to an intermediate terminal.

The output circuit of one of the amplifiers, for example the amplifier 31 for the right channel, is coupled to an additional detector 51. The output circuit of detector 51 is connected to a beam-intensity control electrode 52 provided in the tube 40, the electrode 52 having a suitable bias potential applied thereto through a resistor 53 from the energizing source 44.

The load resistor 45 of the deflection tube 40 is coupled through a condenser 55 to the input electrode of an amplifying and polarity-inverting tube 56 provided with an input-circuit resistor 57. The anode circuit of tube 56 includes a load resistor 58 and a source 59 of space current.

The output circuit of the amplifier 56 is coupled to the intensity-control electrode 60 of a cathode-ray tube 61. A biasing battery 62 is provided between the cathode 63 of the cathode-ray tube 61 and ground. Tube 61 includes a conventional fluorescent display screen 64 and a pair of deflecting electrodes 65, 65, which in turn are coupled to the output circuit of a sweep-signal generator 66 having a synchronizing circuit coupled to an output circuit of the pulse generator 11.

This output circuit of pulse generator 11 also is connected to the input end of a delay circuit 67, which may be quite similar to the delay circuit 24. The output circuit of the unit 67 is coupled to a gating pulse generator 68. Two switching units are provided, a first switching unit 69 for the right channel and a second switching unit 70 for the left channel. These switching units have input circuits coupled to the output circuits of the respective detectors 32 and 34, and they also have control circuits coupled to an output circuit of the gating pulse generator 68. The output circuits of switching units 69 and 70 are coupled to individual halves of the center-tapped primary winding of a transformer 71. The transformer 71 preferably has a rather high voltage step-up turns ratio. Transformer 71 also has a center-tapped secondary winding, the opposite ends of which are connected to the anodes of individual diodes 72 and 73. The cathodes of diodes 72 and 73 are returned to the center tap of the transformer secondary through respective condensers 74 and 75, which conveniently may have quite small capacitances to permit rapid charging thereof to appreciable voltages. One-half of a center-tapped resistor 76 is connected across each of the condensers 74 and 75, and the end of this resistor which is connected to the cathode of diode 72 is grounded.

The right and left signal-translating channels 31, 32 and 33, 34 are designed to have certain individual amplitude-translation characteristics. These characteristics are made relatively adjustable by providing the amplifier 33 for the left channel with a conventional automatic-gain-control or A. G. C. circuit which is coupled to the output circuit of the rectifier system comprising elements 72—76, inclusive.

Considering now the operation of the direction finder just described, generator 11 produces a signal of periodic-pulse wave form the pulses of which have any desired pulse duration and spacing. This signal is applied to transmitter 12 to modulate the wave signal generated therein. Interrogating pulses of radio-frequency energy are radiated from transmitter antenna 13 to the remote body 14, which responds thereto to radiate corresponding pulses of wave-signal energy back to the direction finder. The latter pulses are intercepted by antennas 17 and 18, are amplified in the respective amplifiers 31 and 33, and the pulse-modulation components are derived by the detectors 32 and 34 and differentially combined in the primary winding of transformer 35.

Let it be assumed that the source 14 of response signals happens to be located on a line which is symmetrical with respect to the two directional-response patterns of the receiving antennas 17 and 18. In other words, source 14 is in the surface of symmetry including the antenna 27 and may be directly behind that antenna. Let it further be assumed that the amplitude-translation characteristics of the two channels, including the directional antennas 17 and 18 and the two halves of the primary winding of transformer 35, are identical. Under these assumed conditions, the pulse-modulation components applied to the two halves of the primary winding of the transformer 35 have equal amplitudes and are applied with opposite polarities to the transformer 35 due to the push-pull connection. Thus no pulse voltage is induced in the secondary winding of the transformer.

The secondary winding of transformer 35 and the deflecting electrodes 38 and 39 of the tube 40 also comprise a push-pull circuit, voltages induced in the secondary winding being applied with equal amplitudes but opposite polarities from the two halves of the secondary winding to the respective electrodes. Accordingly, the output signals in the two channels 31, 32 and 33, 34 are differentially applied for effecting deflection of the cathode-ray beam in accordance with the amplitude difference of the output signals. Adjustment of the resistor 37 changes the loading of the transformer 35 and thus determines the sensitivity of the beam-deflection arrangement. Under the assumed conditions, however, the amplitude difference of the output signals is zero and no beam-deflecting voltage is so applied.

Received signals, taken conveniently from the output circuit of the amplifier 31 for the right channel, are demodulated in the detector 51 to derive pulses of positive polarity across the resistor 53. In this way received signals are applied to the beam-intensity control electrode 52 for effectively actuating the cathode-ray beam in the presence of received signals. Conventional pulse-shaping circuits may be used in the detector 51 so that the pulse applied to the control electrode 52 has sufficient amplitude to actuate the beam only during the short periods when the output signals of the two channels are being differentially applied to the deflecting electrodes 38 and 39.

The mask 41 and target electrode 42 in the tube 40 and the resistor 45 comprise means responsive to a predetermined range of deflection positions of the actuated cathode-ray beam for deriving a control effect. Thus when the deflection is very small or zero during the reception of a response pulse signal, as in the case under consideration, the beam passes through the central aperture and impinges on the target 42. The resistor 45 in the path of the beam current derives a control effect during such impingement, this effect being a voltage of pulse wave form and negative polarity. This voltage pulse is amplified and reversed in polarity in the circuits of the tube 56 and is then applied to the intensity-control electrode 60 of the cathode-ray tube 61 to turn on the cathode-ray beam in that tube.

Meanwhile a sweep signal of saw-tooth wave form is generated by the generator 66 in synchronism with the interrogating pulses of the transmitter 12 and is applied to the horizontal-deflecting electrode 65 of the tube 61. This sweep signal causes the cathode-ray beam of tube 61 to be deflected horizontally at constant velocity to trace a succession of superimposed trace lines in conventional manner. The biasing voltage applied between the control electrode and cathode of the tube 61 by the battery 62 may be chosen so that the trace lines are faintly visible on the screen 64. As illustrated in Fig. 2, the resulting trace 77 forms a time base and may be graduated in a conventional manner in terms of miles of distance between the direction finder and a remote object 14. Thus at the instant when the signal of pulse wave form is applied through the amplifier 56 to the control electrode 60 to turn on the cathode-ray beam as earlier described, the beam is being deflected by the deflection field of the electrodes 65, 65 and impacts the fluorescent screen 64 at a point along the trace line indicative of the distance between the direction finder and the remote object. Since the time base is synchronized with the interrogating signal, an indication appears at the same point on the screen 64 during each sweep. Assuming by way of example that the distance to the remote object 14 is about fifteen miles, an illuminated spot 78, Fig. 2, is produced.

While a wave-signal pulse from the transmitter 12 is propagating between the direction finder and the remote object, the corresponding modulation-signal pulse is translated from the pulse generator 11 through the delay circuit 24 to the modulator 26. The delayed pulses applied to the modulator 26 modulate the wave-signal energy from generator 25, and the resulting pulse-modulated signals are applied to the antenna 27, which in this way periodically radiates calibration signals to the antennas 17 and 18 for translation by each of the channels 31, 32 and 33, 34. Delay circuit 24 should be adjusted so that the delay obtained therein corresponds to a round-trip time of propagation of wave-signal energy over a distance outside the useful range of the direction finder. If the useful maximum range is 50 miles, the delay may correspond to a range of about 55 miles. Accordingly, the pulse-modulated wave signal is received by the antennas 17 and 18 and applied to their associated signal-translating channels as pulse-modulated calibration signals having a predetermined time relationship to the pulse-modulated energy radiated by antenna 13. These calibration signals after translation through the two channels produce individual calibration output signals across the two halves of the primary winding of transformer 35.

The delay of the delay circuit 67 is chosen so that just before the calibration signals are applied to the two channels, a pulse reaches the output terminals of the delay circuit 67. This delay pulse triggers the gating pulse generator 68 to cause the generation of a pulse which may be of somewhat greater duration than the pulses from the generator 11. This gating pulse is applied to control the switching units 69 and 70 in a conventional manner to condition these switching units for translating signals from the two channels to individual halves of the primary of the transformer 71. In this way the units 67–70, inclusive, are responsive to the predetermined time relationship of the pulsed calibration output signals and to the timing of the interrogating signals for selecting the calibration output signals substantially to the exclusion of the other output signals, so that this time relationship is a characteristic of the calibration signals which produces calibration output signals distinguishable from the other output signals. Such other output signals either do not have the predetermined time relationship to the occurrence of the interrogating pulses, as introduced by the delay circuit 24, or they originate at remote objects of such great range that they do not have appreciable amplitudes, and hence cannot affect the operation of the circuit following the transformer 71.

The switching units 69 and 70 and the two sides of the primary of transformer 71 are easily designed to be identical. These switching units and the transformer 71 are simple and dependable devices which for practical purposes may be depended upon to maintain their original adjustment during operation. Since the antenna 27 is symmetrically located with respect to the directional patterns of the antennas 17 and 18, since the amplitude translation characteristics of the two channels 31, 32 and 33, 34 have been assumed to be identical, and since the switching units are identical, the calibration output signals applied differentially to the two halves of the primary of transformer 71 are equal and cancel each other in the transformer. Therefore, no signal is applied to the secondary circuit of the transformer.

The receiving antenna system 17, 18 and the two channels 31–35, inclusive, are responsive to the received radiated-signal energy for producing in the two channels individual output signals having amplitudes individually varying with the direction of arrival of the received energy at the receiving system. For purposes of illustration, let it now be assumed that, although the amplitude-translation characteristics of the two channels still remain identical, the source 14 no longer lies directly behind the antenna 27 but instead is located to the left of a line symmetrical with respect to the directional patterns of the antennas 17 and 18. As illustrated diagrammatically in Fig. 1, the antenna 18 faces the source 14 which, however, lies considerably to the left of the direction of maximum response of the antenna 17. Therefore the signals introduced into and translated through the left channel 33, 34 are of considerably greater amplitude than those translated through the right channel 31, 32. As a result, a pulse signal of substantial amplitude is induced in the secondary winding of the transformer 35 at the same time that the detector 51 applies an actuating signal to the intensity-control electrode 52 of the cathode-ray tube 40. This signal induced in the secondary winding causes the actuated cathode-ray beam to be deflected from the central aperture in the mask 41 and thus to be prevented by the mask from reaching the target electrode 42. Consequently, no signal passes through the amplifier 56 and no indication can appear on the display screen 64 of the tube 61.

If the source 14 of response signals were located on the opposite side of a line symmetrical with respect to the directional patterns of the antennas 17 and 18 than last assumed, the signals applied to the primary of transformer 35 again would be unequal but with the signal from the right channel 31, 32 having the higher amplitude. Again the cathode-ray beam in the tube 40 would be deflected, but in the opposite direction, and again no control voltage would appear across the load resistor 45. Accordingly, an indication such as 78 will not appear unless the source of response signals passes in front of the receiving antenna system 17, 18 or unless the crank 22 is turned to align the receiving antenna system so that a line symmetrical with respect to the two directional patterns passes through or near a source of response signals.

Now let it be assumed, however, that an unbalanced condition develops in the two channels 31, 32 and 33, 34. A difference in the amplitude-translation characteristics of the right and left channels causes the two output signals to have equal amplitudes when the source of response signals is not on a line of symmetry of the receiving antenna system. Mechanical misalignment of or damage to the receiving antenna may have the same effect as far as the indications are concerned. Accordingly, the accuracy of the indication 78 is dependent upon the maintenance of a perdetermined ratio between the values of the amplitude-translation characteristics of the two channels, of which at least one may undesirably change to impair the accuracy of indication.

The same unbalanced amplitude-translation condition which causes the undesirable changes in the relative amplitudes of output signals corresponding to the response signals from source 14 also causes similar changes in the relative amplitudes of the individual calibration output signals in the two channels. Thus the units 24—27 constitute means for periodically applying to the input circuits of the channels for translation thereby calibration signals to produce individual calibration output signals having amplitudes individually varying with the individual amplitude-translation characteristics of the channels. The switching units 69 and 70, the transformer 71, the diode circuit 72—76, and the gain-control circuit in amplifier 33 together constitute means responsive primarily to the relative amplitudes of th ecalibration output signals, having the predetermined time relationships selected in the switching units, for controlling at least one of the channels substantially to maintain a predetermined ratio of the values of the amplitude-translation characteristics. This is effective to decrease the effect of undesirable changes of value of one of the amplitude-translation characteristics in impairing the accuracy of the indication of direction.

As an example of the operation of the arrangement for maintaining such predetermined ratio in the two channels, let it be assumed that the gain of the right channel 31, 32 increases. This correspondingly increases the amplitude of the calibration output signal in the right channel. The individual calibration output signals combined differentially in the primary winding of transformer 71 are now unequal, and a voltage pulse of appreciable amplitude is developed in the secondary winding. The latter winding is so poled that this voltage pulse is applied with positive polarity to the anode of diode 73 and with negative polarity to the anode of diode 72. Hence only diode 73 can conduct, and the resulting current through condenser 75 charges that condenser so that the cathode of diode 73 is positive with respect to the center tap of resistor 76. The two halves of the resistor 76 are selected to have quite high resistances in relation to the rather small capacitances of the condensers 74 and 75. Consequently, the condenser 75 discharges through the resistor so slowly that, after a number of successive calibration-signal pulses have passed through the diode 73, the condenser 75 assumes an average voltage almost as great as the voltage induced in its half of the secondary winding by each pair of unbalanced calibration output signals. The positive voltage thus developed across the condenser 75 is applied to increase the gain of the amplifier 33 in the left channel 33, 34, substantially compensating for the increased gain of the right channel.

If the gain in the left channel 33, 34 should tend to decrease, the operation would be the same as if the gain in the right channel had increased, and the gain-control circuit of the amplifier 33 would again be caused to increase the gain of the left channel toward its original value. Conversely, if the gain in the right channel 31, 32 tends to decrease or the gain in the left channel 33, 34 tends to increase, a positive voltage would appear on the anode of the diode 72 which would then conduct to place a negative voltage on the condenser 74 at the center tap of the resistor 76. Any opposing charge which might remain on the condenser 75 then would be dissipated through its half of resistor 76, leaving a net voltage of negative polarity between the cathode of the diode 73 and ground. This negative calibration-control signal would cause a decrease in gain of the left channel 33, 34, thus counteracting the tendency toward an unbalanced gain condition. In this way the gain of the left channel is controlled responsive primarily to the amplitude difference of the individual calibration output signals.

Antenna 27 preferably is separated from the receiving antennas 17 and 18 by a distance sufficient to render the directional properties of the receiving antennas effective. However, if the antennas are located symmetrically above the grounded plate 19, the length of the plate required for this purpose is not prohibitive and may be made quite reasonable at a suitably high frequency. As is well known, the electric and magnetic fields existing in the immediate neighborhood of an antenna differ from the radiation fields existing at a distance of many wave lengths. Nevertheless, the receiving antennas still exhibit a directional response to the resultant fields in the vicinity of the antenna 27 provided at least a minimum spacing is provided between the antennas 17, 18 on the one hand and the antenna 27 on the other. The effective directivity under these conditions may be enhanced by limiting to only a slight amount the energy radiated by the antenna 27. If necessary, this antenna may be quite small and the lead to it may be well shielded.

As long as the gain-control arrangement just described is effective to maintain the balanced gain condition of the two channels, the individual calibration output signals in the primary winding of transformer 35 will have equal or only slightly unequal amplitudes and hence are translated through the beam-deflection tube 48 to develop a positive signal at the load resistor 58 of the amplifier 56. Consequently, the trace 77 depicted in Fig. 2 will show a bright indication 79 at a range in excess of the useful range of the direction finder, for example about 55 miles. If this indication 79 should not appear, the operator of the direction finder is warned of a failure of the calibration arrangement or of some other circuit component. In this way the direction finder may be made to "fail safe," since a warning is afforded of failure to indicate direction properly.

Referring now to Fig. 3, there is represented, partly in schematic form, apparatus embodying a modified form of the present invention suitable to afford a map or plan indication of position. Elements corresponding to similar elements of the Fig. 1 arrangement have the same reference numerals, while analogous elements have the corresponding reference numerals primed. Pulses are both generated and applied to modulate a carrier signal in the unit 12'. The pulse-modulated signal radiated from the antenna 13 evokes response wave signals from the remote source 14.

The two receiving antennas 17 and 18 are carried on a frame 16' continuously rotatable by means of a worm gear 20' and bevel gears 21' driven by a motor 22'. The two signal-translating channels are similar to those of the Fig. 1 arrangement, the individual output signals thereof again being differentially combined in the primary winding of a transformer 35'. A resistor 36 is inserted between the center tap of this primary winding and ground and the two output signals are additively combined in this resistor to develop a control voltage when either one of the individual output signals has a substantial amplitude.

The beam-deflection tube 40' is the same as the beam-deflection tube of the Fig. 1 arrangement, except that no beam-intensity control electrode is provided. The cathode-ray beam impinges on the target electrode 42 at all times except during the duration of output pulses of unequal amplitudes, which when differentially combined cause a deflection of the beam onto the mask 41 in an upward or downward direction depending upon the polarity of the resultant pulse. When this occurs the cathode-ray-beam current ceases to flow through the load resistor 45 for an interval equal to the duration of the received pulses, thereby causing a corresponding pulse of positive polarity to be developed across the target resistor 45.

This positive pulse is applied through condenser 55 to a repeater and polarity inverter 56'. The repeater 56' includes in its control-electrode circuit a source of biasing potential 80 for preventing anode-current flow except during the application of a positive pulse to the input circuit of the repeater. When such a pulse is applied, however, a pulse of negative polarity is derived in the anode circuit of the repeater 56' and is applied through a condenser 81 to the suppressor electrode of a pentode vacuum tube 82 having a resistor 83 connected between its suppressor electrode and cathode. The tube 82 also is provided with an anode-load resistor 84 connected to a source of space current 59' and with a source of biasing potential 86 connected between its cathode and ground.

The positive voltage pulse developed across the resistor 36 during the reception of signals of pulse wave form on either or both of the channels 31, 32 and 33, 34 serves as a first control voltage tending to overcome the bias of the source 86 and to cause pulses of anode current to flow in the tube 82. However, the load resistor 45 and repeater 56' are responsive to a predetermined range of deflection positions of the cathode-ray beam of tube 40' for deriving a second control voltage. More specifically, when the cathode-ray beam is deflected into a position such that the beam strikes the mask 41 instead of the target electrode 42, a control voltage of pulse wave form is derived and applied with negative polarity to the suppressor electrode of the tube 82 to prevent flow of anode current therein and hence to counteract the tendency of the first control voltage to cause a flow of anode current during a received pulse. Thus the pentode tube 82 is responsive to both the first and the second control voltages for developing a voltage pulse of negative polarity at its anode when response signals are received, but does so only in the event that the output signals of the two channels are of approximately equal amplitude and hence are suitable for indication by a visual display device.

The negative pulses are applied through the condenser 87 to the control electrode of a triode vacuum tube 88 having an input-circuit resistor 89 and an anode-load resistor 90 connected to the source of space current 59'. The anode of the tube 88 is coupled to the intensity-control electrode 60' of a cathode-ray tube 61'. Tube 88 normally is conducting, but the negative pulse applied to its control electrode causes its anode current to drop sufficiently that the voltage applied to the beam-intensity control electrode 60' exceeds the biasing voltage applied by the biasing battery 62' to the cathode 63' of the cathode-ray tube 61', thus turning on the cathode-ray beam to indicate the direction of arrival of received energy from the remote wave-signal source 14.

The beam-deflecting element of the tube 61' is carried on a yoke 65' provided with a pair of slip rings and brushes 91 and 92 for carrying deflection signals from the generator 66' to the beam-deflecting element in the yoke 65'. A pinion wheel 93 mounted on the yoke is driven through a worm gear provided on a shaft 94 and a pair of bevel gears 95 from the motor 22' to provide for continuous rotation of the yoke 65' in a predetermined sense. As the receiving antenna system 16', 17, 18 is rotated by the motor 22' to scan a sector of space, preferably a complete circle, the yoke 65' is driven in rotational synchronism therewith by the gearing 93, 95 to provide on the display screen 64' of the tube 61' a sectorial map-type display.

The operation of the Fig. 3 arrangement to provide a position indication is similar to that of the Fig. 1 arrangement, but with the addition of the second dimension to the display. Let it be assumed that, as in the example illustrated in the Fig. 1 arrangement, the source 14 has a range of about fifteen miles and in addition is in a northeasterly direction for the direction finder. The sweep signal is adjusted so that the useful range of the direction finder is about 50 miles, at which range the sweep signal causes a deflection of the beam from the center of the screen 64' almost to the periphery thereof. The gearing 93, 95 is adjusted initially so that the sweep direction is vertically upward when the receiving antenna system points due north. As the receiving antenna system 17, 18 rotates so that it faces in a direction approaching the northeasterly direction, pulse-response signals are translated through one or both of the channels 31, 32 and 33, 34 so as to place positive pulses on the control electrode of the tube 82. Until the antenna system faces northeast, however, the signal pulses of unequal amplitudes translated by the two channels cause the tubes 40' and 56' to develop pulses of negative polarity which are applied simultaneously to the suppressor electrode of the tube 82 and thus prevent an indication on the cathode-ray tube 64'. When the receiving antenna system reaches an angular position facing in a northeasterly direction, the response signals translated by the two channels balance out in the transformer 35', permitting the cathode-ray beam of the tube 61' to be turned on when the beam has reached the position 78' illustrated in Fig. 4.

The Fig. 3 apparatus also includes a transpondor 28 with a fixed time delay and having a nondirectional antenna 27'. The transpondor and its antenna have a fixed positional relationship to the location of the receiving antenna system, so that the receiving antenna system faces the antenna 27' only during one small portion of its rotational scanning. The transpondor 28 is a device which intercepts signals transmitted by the pulse transmitter 12', derives the modulation components of the intercepted signals, subjects the derived components to a fixed time delay, and utilizes the delayed signals to cause the transmission by the antenna 27' of a pulse-modulated response signal. The response transmitter in the transpondor 28 preferably generates wave signals of the same carrier frequency as that of the response signal from a source 14. Such a transpondor may be of conventional design and, since it may be located quite near the pulse transmitter 12' and the receiving antenna system 16', 17, 18, it may be extremely low power.

As an example, the fixed direction of the transpondor from the location of the receiving antenna system may be north, corresponding to a vertical deflection on the display screen 64', and the distance of the transpondor from the antenna system may be less than a mile. The transpondor, of suitably low power capabilities, even may be in the tail structure of an airplane having the receiving antenna system rotatably mounted near the nose thereof. A convenient total time delay, as with the arrangement of Fig. 1, may be that corresponding to about 55 miles of range. In that case the fixed time delay of the transpondor 28 is adjusted so that the time for propagation to and from the transpondor plus the fixed time delay of the transpondor equals the round-trip time of propagation for an object 55 miles distant from the receiving antenna system. Then, whenever the receiving antenna system faces in the direction of the transpondor, the response signals are translated through the direction-finder circuit to cause an indication such as would be caused by a transpondor source of response signals 55 miles distant. The resulting indication for such an arrangement is shown at 79' on the screen 64' in Fig. 4.

A special form of control arrangement is provided, by means now to be described in connection with Fig. 4, from the display screen 64' of the cathode-ray tube 61' through two control circuits 96 and 97 to the input circuit of an automatic-gain-control or A. G. C. unit 98. As illustrated in Fig. 3, an output circuit of the control unit 98 applies automatic-gain-control voltages through a control circuit 99 to the gain-control circuit of the amplifier 33 of the left channel.

Referring now more specifically to Fig. 4, two photocells 101 and 102 are provided adjacent the display surface 64'. By means of two lenses 103 and 104, any light produced by fluorescence in two specific areas of the display screen 64' is focused on the photoelectric surfaces of the respective photocells 101 and 102. The location of the areas thus adapted to supply light to the two photocells is represented as that between dashed arcs on the display screen 64'. Now, if the gain of the right channel 31, 32 should increase, the individual calibration output signals resulting from the signal received by antennas 17 and 18 from the transpondor 28 would not be of equal magnitudes until the antennas have moved from true north and thus from the position corresponding to a vertical deflection of the cathode-ray beam in the tube 61'. The calibration signals become of equal amplitudes under the assumed conditions when the antennas 17, 18 move to a position facing somewhat east of north, assuming scanning in a clockwise sense. At that time an indication would appear on the screen 64'. This angular deviation might be, for example, about ten degrees and the spot 79' would appear as if it represented an object 55 miles distant but ten degrees east of north instead of due north, as shown. As shown in Fig. 4, the lens 104 and associated photocell 102 are arranged so that light is focused on the photosensitive surface of that photocell from any indication deviating angularly in a clockwise sense from the position of the indication 79' by amounts between, for example, one or two degrees and the largest deviation likely to be caused by unbalanced conditions in the two channels.

The appearance of spot 79' in the erroneous position last assumed causes the photocell 102 to be actuated, and current flows from an energizing source 107 through the conductor 97 and the lower solenoid of a double-throw relay 106. The movable contact of the double-throw relay 106 is connected through the field winding 108 of a direct-current reversible motor 109 to the solenoid of another relay 111, and thence to the ground terminal of a balanced direct-current power line 112. The switch point placed in circuit by actuation of the lower solenoid of the relay 106 is connected to the positive side of the line 112 for supplying field currents of positive polarity to the motor 109. Actuation of either of the opposed solenoids of the relay 106 also energizes the solenoid of the relay 111 so as to connect the armature winding of the motor 109 between the positive and negative sides of the line 112. Accordingly, when the lower solenoid of the relay 106 is energized, the shaft of the motor 109 rotates in a predetermined sense. This shaft is mechanically coupled through suitable reduction gearing, not shown, to the rotatable arm 113 of a potentiometer 114 which is connected across one half of the line 112 in series with a suitable dropping resistor 115. The mechanical coupling of the motor and potentiometer shaft is such that the potentiometer moves to decrease the negative voltage applied to the A. G. C. circuit conductor 99, thus increasing the gain of the amplifier 33 for the left channel to balance the increased gain of the right channel.

If the unbalance of the two channels were in the opposite sense to that first assumed, the indication 79' would be shifted in a counterclockwise sense so as to excite the photocell 101 and energize the upper solenoid of the relay 106. The corresponding switch point of the relay is connected to the negative terminal of the line 112, so that the field winding 108 then carries field currents of negative polarity and the motor 109 rotates in the opposite sense to cause the potentiometer to increase the negative bias applied to the A. G. C. circuit of the amplifier 33. The gain conditions of the two amplifiers again approach a balanced condition.

It will be understood that it may be desirable to insert amplifiers between the photocells and their associated solenoid coils to obtain sufficient current to energize the relay 106. Usually motor 109 is excited for only a very short period, after which the desired ratio of the gain characteristics of the two channels will have been restored and the indication 79' returned to its predetermined position representing due north. Suitable damping may be provided to prevent overrunning of the potentiometer arm. The resulting change in the relative gain characteristics causes a similar corrective rotation of the entire map-type display. Thus calibration signals for calibrating the relative gain of the two channels are obtained each time the scanning antennas pass through the north position. Any failure of the calibrating arrangement to correct an unbalanced condition in the two channels may be made evident to the observer as a substantial misplacement of the calibration indication 79' on the screen 64' so that this arrangement also has the advantage that it "fails safe."

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A radiated-signal direction finder comprising: means including two signal-translating channels, having individual and relatively adjustable amplitude-translation characteristics, for receiving radiated-signal energy and responsive thereto for producing in said channels individual output signals having amplitudes individually varying with the direction of arrival of said energy at said means; means responsive to the relative amplitudes of said individual output signals for indicating said direction, the accuracy of said indication being dependent upon the maintenance of a predetermined ratio between the values of said characteristics of which at least one may undesirably change to impair said accuracy of indication; means for periodically applying calibration signals to said channels for translation thereby to produce individual calibration output signals distinguishable from said first-mentioned output signals; and means responsive primarily to the relative amplitudes of said calibration output signals for controlling at least one of said channels substantially to maintain said predetermined ratio of the values of said amplitude-translation characteristics, thereby to decrease the effect of changes of value of said one characteristic in impairing the accuracy of said indication of direction.

2. A radiated-signal direction finder comprising: means including two signal-translating channels, having individual radiant-signal translators with relatively fixed but partially overlapping directional-response patterns movable to scan a predetermined space and having individual and relatively adjustable amplitude-translation characteristics, for receiving radiated-signal energy and responsive thereto for producing in said channels individual output signals having amplitudes individually varying with the direction of arrival of said energy at said means; means responsive to the relative amplitudes of said individual output signals for indicating said direction, the accuracy of said indication being dependent upon the maintenance of a predetermined ratio between the values of said characteristics of which at least one may undesirably change to impair said accuracy of indication; means including a radiant-signal translator having a fixed directional relationship to said first-mentioned translators and movable therewith for periodically radiating calibration signals to said translators for translation by each of said channels to produce individual calibration output signals distinguishable from said first-mentioned output signals; and means responsive primarily to the relative amplitudes of said calibration output signals for controlling at least one of said channels substantially to maintain said predetermined ratio of the values of said amplitude-translation characteristics, thereby to decrease the effect of changes of value of said one characteristic in impairing the accuracy of said indication of direction.

3. A radiated-signal direction finder comprising: means including two signal-translating channels, having individual and relatively adjustable amplitude-translation characteristics, for receiving radiated-signal energy and responsive thereto for producing in said channels individual output signals having amplitudes individually varying with the direction of arrival of said energy at said means; means responsive to the relative amplitudes of said individual output signals for indicating said direction, the accuracy of said indication being dependent upon the maintenance of a predetermined ratio between the values of said amplitude-translation characteristics of which at least one may undesirably change to impair said accuracy of indication; means for periodically applying to said channels for translation thereby calibration signals having a characteristic such as to produce in said channels individual calibration output signals distinguishable from said first-mentioned output signals; means responsive to said last-mentioned characteristic for selecting said calibration output signals substantially to the exclusion of said first-mentioned output signals; and means responsive to the relative amplitudes of said selected output signals for controlling at least one of said channels substantially to maintain said predetermined ratio of the values of said amplitude-translation characteristics, thereby to decrease the effect of changes of value of said one amplitude-translation characteristic in impairing the accuracy of said indication of direction.

4. A radiated-signal direction finder comprising: means including two signal-translating channels, having individual and relatively adjustable amplitude-translation characteristics, for receiving radiated-signal energy and responsive thereto for producing in said channels individual output signals having amplitudes individually varying with the direction of arrival of said energy at said means; means responsive to the relative amplitudes of said individual output signals for indicating said direction during successive operating periods, the accuracy of said indication being dependent upon the maintenance of a predetermined ratio between the values of said characteristics of which at least one may undesirably change to impair said accuracy of indication; means for periodically applying to said channels for translation thereby calibration signals of pulse wave form having a predetermined time relationship to said operating periods to produce in said channels individual calibration output signals distinguishable from said first-mentioned output signals; means responsive to said time relationship for selecting said calibration output signals substantially to the exclusion of said first-mentioned output signals; and means responsive to the relative amplitudes of said selected output signals for controlling at least one of said channels substantially to maintain said predetermined ratio of the values of said amplitude-translation characteristics, thereby to decrease the effect of changes of value of said one characteristic in impairing the accuracy of said indication of direction.

5. A radiated-signal direction finder comprising: means including two signal-translating channels, having individual and relatively adjustable amplitude-translation characteristics, for receiving radiated-signal energy and responsive thereto for producing in said channels individual output signals having amplitudes individually varying with the direction of arrival of said energy at said means; means responsive to the relative amplitudes of said individual output signals for indicating said direction, the accuracy of said indication being dependent upon the maintenance of a predetermined ratio between the values of said characteristics of which at least one may undesirably change to impair said accuracy of indication; means for periodically applying calibration signals to the input circuits of said channels for translation therethrough to produce individual calibration output signals distinguishable from said first-mentioned output signals and having amplitudes individually varying with said individual amplitude-translation characteristics of said channels; and means responsive primarily to the relative amplitudes of said calibration output signals for controlling at least one of said channels substantially to maintain said predetermined ratio of the values of said amplitude-translation characteristics, thereby to decrease the effect of changes of value of said one characteristic in impairing the accuracy of said indication of direction.

6. A radiated-signal direction finder comprising: means including two signal-translating channels, effectively having individual radiant-signal translator means with partially overlapping directional-response patterns and having individual and relatively adjustable amplitude-translation characteristics, for receiving radiated-signal energy and responsive thereto for producing in said channels individual output signals having amplitudes individually varying with the direction of arrival of said energy at said means; means responsive to the relative amplitudes of said individual output signals for indicating said direction, the accuracy of said indication being dependent upon the maintenance of a predetermined ratio between the values of said characteristics of which at least one may undesirably change to impair said accuracy of indication; means for periodically radiating calibration signals to said radiant-signal translator means for translation by each of said channels to produce individual calibration output signals distinguishable from said first-mentioned output signals; and means responsive primarily to the relative amplitudes of said calibration output signals for controlling at least one of said channels substantially to maintain said predetermined ratio of the values of said amplitude-translation characteristics, thereby to decrease the effect of changes of value of said one characteristic in impairing the accuracy of said indication of direction.

7. A radiated-signal direction finder comprising: means including two signal-translating channels, having individual radiant-signal translators with partially overlapping directional-response patterns and having individual and relatively adjustable amplitude-translation characteristics, for receiving radiated-signal energy and responsive thereto for producing in said channels individual output signals having amplitudes individually varying with the direction of arrival of said energy at said means; means responsive to the relative amplitudes of said individual output signals for indicating said direction, the accuracy of said indication being dependent upon the maintenance of a predetermined ratio between the values of said characteristics of which at least one may undesirably change to impair said accuracy of indication; means including a radiant-signal translator having a fixed directional relationship to said first-mentioned translators for periodically radiating calibration signals to said translators for translation by each of said channels to produce individual calibration output signals distinguishable from said first-mentioned output signals; and means responsive primarily to the relative amplitudes of said calibration output signals for controlling at least one of said channels substantially to maintain said predetermined ratio of the values of said amplitude-translation characteristics, thereby to decrease the effect of changes of value of said one characteristic in impairing the accuracy of said indication of direction.

8. A radiated-signal direction finder comprising: means including two signal-translating channels, having individual radiant-signal translators with relatively fixed but partially overlapping directional-response patterns movable to scan a predetermined space and having individual and relatively adjustable amplitude-translation characteristics, for receiving radiated-signal energy and responsive thereto for producing in said channels individual output signals having amplitudes individually varying with the direction of arrival of said energy at said means; means responsive to the relative amplitudes of said individual output signals for indicating said direction, the accuracy of said indication being dependent upon the maintenance of a predetermined ratio between the values of said characteristics of which at least one may undesirably change to impair said accuracy of indication; means including a radiant-signal translator having a fixed space relationship to the location of said first-mentioned translators for periodically radiating calibration signals to said translators for translation by each of said channels to produce individual calibration output signals distinguishable from said first-mentioned output signals; and means responsive primarily to the relative amplitudes of said calibration output signals for controlling at least one of said channels substantially to maintain said predetermined ratio of the values of said amplitude-translation characteristics, thereby to decrease the effect of changes of value of said one characteristic in impairing the accuracy of said indication of direction.

9. A radiated-signal direction finder comprising: means including two signal-translating channels, having individual radiant-signal translators with relatively fixed but partially overlapping directional-response patterns movable to scan a predetermined space and having individual and relatively adjustable amplitude-translation characteristics, for receiving radiated-signal energy and responsive thereto for producing in said channels individual output signals having amplitudes individually varying with the direction of arrival of said energy at said means; means responsive to the relative amplitudes of said individual output signals for indicating said direction, the accuracy of said indication being dependent upon the maintenance of a predetermined ratio between the values of said characteristics of which at least one may undesirably change to impair said accuracy of indication; means including a nondirectional radiant-signal translator having a fixed directional relationship to said first-mentioned translators for periodically radiating calibration signals to said translators for translation by each of said channels to produce individual calibration output signals distinguishable from said first-mentioned output signals; and means responsive primarily to the relative amplitudes of said calibration output signals for controlling at least one of said channels substantially to maintain said predetermined ratio of the values of said amplitude-translation characteristics, thereby to decrease the effect of changes of value of said one characteristic in impairing the accuracy of said indication of direction.

10. A radiated-signal direction finder comprising: means including two signal-translating channels, having individual and relatively adjustable amplitude-translation characteristics, for receiving radiated-signal energy and responsive thereto for producing in said channels individual output signals having amplitudes individually varying with the direction of arrival of said energy at said means; means responsive to the relative amplitudes of said individual output signals for indicating said direction, the accuracy of said indication being dependent upon the maintenance of a predetermined ratio between the values of said characteristics of which at least one may undesirably change to impair said accuracy of indication; means for periodically applying calibration signals to said channels for translation thereby to produce individual calibration output signals distinguishable from said first-mentioned output signals; and means for effectively differentially combining said calibration output signals and responsive to the amplitude difference thereof for controlling at least one of said channels substantially to maintain said predetermined ratio of the values of said amplitude-translation characteristics, thereby to decrease the effect of changes of value of said one characteristic in impairing the accuracy of said indication of direction.

11. A radiated-signal direction finder comprising: means for radiating pulse-modulated wave-signal energy in the direction of a remote object; means including two signal-translating channels, having individual and relatively adjustable amplitude-translation characteristics, for receiving response wave-signal energy radiated from said remote object and responsive to said received energy for producing in said channels individual output signals having amplitudes individually varying with said direction of said remote object; means responsive to the relative amplitudes of said individual output signals for indicating said direction, the accuracy of said indication being dependent upon the maintenance of a predetermined ratio between the values of said amplitude-translation characteristics of which at least one may undesirably change to impair said accuracy of indication; means for periodically applying pulse-modulated calibration signals to said channels for translation thereby to produce individual calibration output signals distinguishable from said first-mentioned output signals; and means responsive primarily to the relative amplitudes of said calibration output signals for controlling at least one of said channels substantially to maintain said predetermined ratio of the values of said amplitude-translation characteristics, thereby to decrease the effect of changes of value of said one characteristic in impairing the accuracy of said indication of direction.

12. A radiated-signal direction finder comprising: means for radiating pulse-modulated wave-signal energy in the direction of a remote object; means including two signal-translating channels, having individual and relatively adjustable amplitude-translation characteristics, for receiving pulse-modulated response wave-signal energy radiated from said remote object and responsive to said received energy for producing in said two channels simultaneously individual output signals having amplitudes individually varying with said direction of said remote object; means responsive to the relative amplitudes of said individual output signals for indicating said direction, the accuracy of said indication being dependent upon the maintenance of a predetermined ratio between the values of said amplitude-translation characteristics of which at least one may undesirably change to impair said accuracy of indication; means for periodically applying to said channels pulse-modulated calibration signals, having a predetermined time relationship to said pulse-modulated energy radiated by said first-mentioned means, for translation of said calibration signals by each of said channels to produce individual calibration output signals; and means responsive primarily to the relative amplitudes of output signals having said predetermined time relationship for controlling at least one of said channels substantially to maintain said predetermined ratio of the values of said amplitude-translation characteristics, thereby to decrease the effect of changes of value of said one characteristic in impairing the accuracy of said indication of direction.

13. A radiated-signal direction finder comprising: means including two signal-translating channels, having individual and relatively adjustable amplitude-translation characteristics, for receiving radiated-signal energy and responsive thereto for producing in said channels individual output signals having amplitudes individually varying with the direction of arrival of said energy at said means; a cathode-ray tube having beam-deflecting means to which said output signals are differentially applied for effecting deflection of the cathode-ray beam in accordance with the amplitude difference of said output signals; means responsive to a predetermined range of deflection positions of said cathode-ray beam for deriving a control effect; means responsive to said control effect for indicating said direction, the accuracy of said indication being dependent upon the maintenance of a predetermined ratio between the values of said characteristics of which at least one may undesirably change to impair said accuracy of indication; means for periodically applying calibration signals to said channels for translation thereby to produce individual calibration output signals distinguishable from said first-mentioned output signals; and means including said cathode-ray tube for differentially combining said individual calibration output signals and responsive primarily to the amplitude difference thereof for controlling at least one of said channels substantially to maintain said predetermined ratio of the values of said amplitude-translation characteristics, thereby to decrease the effect of changes of value of said one characteristic in impairing the accuracy of said indication of direction.

KNOX McILWAIN.

References Cited in the file of this patent

UNITED STATES PATENTS

| Number | Name | Date |
|---|---|---|
| 2,400,641 | Hardy | May 21, 1946 |
| 2,409,462 | Zworykin | Oct. 15, 1946 |
| 2,418,143 | Stodola | Apr. 1, 1947 |
| 2,421,016 | Deloraine | May 27, 1947 |
| 2,426,460 | Lewis | Aug. 26, 1947 |
| 2,427,905 | Fyler | Sept. 23, 1947 |
| 2,431,990 | Craib | Dec. 2, 1947 |
| 2,445,213 | Evans | July 13, 1948 |
| 2,450,946 | Evans | Oct. 12, 1948 |
| 2,464,822 | Mallett | Mar. 22, 1949 |
| 2,467,361 | Blewett | Apr. 12, 1949 |
| 2,493,774 | Moore | Jan. 10, 1950 |
| 2,508,384 | Gross | May 23, 1950 |